Patented May 27, 1947

2,421,000

UNITED STATES PATENT OFFICE 2,421,000

TEXTILE DECORATING COMPOSITION

Edward Armatys, New York, N. Y., assignor to Interchemical Corporation, New York, N. Y., a corporation of Ohio No Drawing. Application October 30, 1943, Serial No. 508,390

3 Claims. (Cl. 260—18)

This invention relates to textile decorating compositions of the water-in-lacquer emulsion type, and aims to provide emulsions of this general sort, characterized by unusual stability.

The usefulness of water-in-lacquer emulsions for the production of textile decorating compositions was first described by Jenett (U. S. Patent No. 2,222,581 and 2,222,582), who used these emulsions for the printing of fabrics, particularly with pigments. The Cassel Patent No. 2,202,283 describes the applicability of these emulsions to dyestuff printing, and the Cassel U. S. Patent No. 2,248,696 describes the use of these emulsions in the overall pigment coloration of fabrics.

In order to get compositions of optimum stability, it is necessary to choose the film-formers present in the lacquers with some care. This is true not only in the very low-solids emulsions (such as are described in U. S. Patent No. 2,202,-283) where the film-formers act primarily as emulsifying agents, but it is also true in the higher solids pigmented emulsions, in particular those using heat-convertible resins to ensure washfastness of the pigmented decoration; this is due to the fact that most readily heat-convertible resins by themselves produce emulsions which are not notably stable. In the past, stability has been lent to such emulsions by the use of fairly long-oil alkyd resins. Since these resins are often not available, and leave something to be desired as stabilizers, a substitute is desirable.

I have discovered that very stable water-in-lacquer emulsions can be made by using, as the emulsifying film-former in the lacquer, the reaction product of formaldehyde with the addition product of an unsaturated fatty oil and an alpha-olefinic dicarboxylic acid, such as maleic, fumaric, citraconic and itaconic acids.

It is well known that maleic and similar alpha olefinic dibasic acids will react with unsaturated fatty oils to form addition products, and it has been proposed to use the addition products, and their soaps and esters, in film-forming compositions. The soaps have been recommended, because of their water-dispersibility, for the production of water paints, while the addition products and their esters have been suggested for general use.

The addition products alone give very unstable water-in-lacquer emulsions; the soaps, because of their water-dispersibility, will not even produce such an emulsion; nevertheless, after reaction with formaldehyde, the addition produces unusually stable emulsions of the water-in-lacquer type.

Typical examples of my invention are the following:

Example 1

Linseed oil is reacted with 20% of its own weight of maleic anhydride in conventional fashion. 200 parts of such an oil are emulsified with 100 parts of 40% formaldehyde solution, and the mixture is heated with stirring to a temperature of 90–100° C., until frothing subsides. The temperature is increased to 110° C., and the reaction is held for 15 minutes.

Example 2

200 parts of the same maleic-linseed oil, 50 parts of 40% formaldehyde, and ½ part of 85% phosphoric acid, are reacted as in Example 1. This produces an essentially similar product.

The 20% maleic linseed oil product may be replaced by the reaction product of varying percentages (from about 5% up to 30%, based on oil weight) of maleic and similar acids with linseed and other unsaturated fatty oils. Similarly, the amount of formaldehyde used may vary from about 5 to 25% of the oil adduct, based on anhydrous weights.

The maleic anhydride shown in the examples may of course be replaced by other alpha olefinic dicarboxylic acids such as fumaric, citraconic and itaconic acids, and the linseed oil may be replaced by other unsaturated fatty oils such as perilla, soya, walnut, sunflower seed, etc.

The formaldehyde reaction product may be made into emulsions as follows:

Example 3

30 parts by weight of Example 1 or Example 2, 30 parts by weight of Solvesso #3 (hydrogenated petroleum solvent—B. R. 175–210° C.) are made into a concentrated water-in-lacquer emulsion with 30 parts by weight of a 20% NaCl solution, and 10 parts by weight of sulfonated tannin.

A low solids water-in-lacquer emulsion is then produced by mixing 5 parts by weight of the concentrated emulsion with 20 parts by weight petroleum naphtha (boiling range 160–200° C.) and 75 parts by weight water.

The above may be made into a dyestuff printing paste simply by dissolving dyestuff in the water of the final emulsion.

The product of Example 3 may be used as a reducing emulsion for pigmented heat-convertible resin emulsions of the type exemplified by the following:

Example 4

An emulsion was made from a lacquer containing—

| | Parts by weight |
|---|---|
| Solvent-soluble urea-formaldehyde resin solution (50 resin, 30 butanol, 20 xylene) | 12.0 |
| Ethyl cellulose (4% ethoxy—10 centipoise viscosity) | 10.0 |
| Butanol | 4.0 |
| Solvesso #2 (boiling range 135–177° C) | 44.0 | and an aqueous phase containing—

| | Parts by weight |
|---|---|
| Benzidine yellow pulp (dry basis) | 2.0 |
| Water | 28.0 |
| | 100.0 |

Example 5

A typical water-in-lacquer printing emulsion may be made from:

| | Parts by weight |
|---|---|
| Urea resin solution of Example 4 | 5.0 |
| Alkyd resin solution—50% in toluene (33% soya modified glycerol phthalate) | 15.0 |
| Pine oil | 5.0 |
| Solvesso #3 | 34.0 |
| 20% pulp phthalocyanine green | 30.0 |
| Water | 11.0 |

The formaldehyde reaction products of Examples 1 and 2 may be used to replace the alkyd resin in Example 5, and noticeable stability of emulsion is obtained.

Obviously, the formaldehyde reaction products may be used in any of the products described in United States Patents Nos. 2,202,283, 2,222,581 and 2,248,696, with corresponding effect on the stability of the emulsions therein disclosed.

I claim:

1. A stable, coloring matter-containing water-in-lacquer emulsion for use in textile decorating, the lacquer phase of which comprises a vaporizable water-immiscible organic solvent containing, as an emulsifying and stabilizing film-forming material, the reaction product formed by condensing, at a temperature on the order of 90 to 110° C., about 5 to 25 parts by weight of formaldehyde with 100 parts by weight of the addition product of an unsaturated fatty oil and 5 to 30% of oil weight of an alpha-olefinic dicarboxylic acid, said reaction product being compatible with and soluble in said organic solvent.

2. A stable, coloring matter-containing water-in-lacquer emulsion for use in textile decorating, the lacquer phase of which comprises a solution of a heat-setting synthetic resin in a vaporizable water-immiscible organic solvent containing, as an emulsifying and stabilizing film-forming material, the reaction product formed by condensing, at a temperature on the order of 90 to 110° C., about 5 to 25 parts by weight of formaldehyde with 100 parts by weight of the addition product of an unsaturated fatty oil and 5 to 30% of oil weight of an alpha-olefinic dicarboxylic acid, said reaction product being compatible with and soluble in said organic solvent.

3. A stable, coloring matter-containing water-in-lacquer emulsion for use in textile decorating, the lacquer phase of which comprises a solution of a heat-setting synthetic resin in a vaporizable water-immiscible organic solvent containing, as an emulsifying and stabilizing film-forming material, the reaction product formed by condensing, at a temperature on the order of 90 to 110° C., about 5 to 25 parts by weight of formaldehyde with 100 parts by weight of the addition product of an unsaturated fatty oil and 5 to 30% of oil weight of maleic acid, said reaction product being compatible with and soluble in said organic solvent.

EDWARD ARMATYS.

REFERENCES CITED

The following references are of record in the file of this patent:

UNITED STATES PATENTS

| Number | Name | Date |
|---|---|---|
| 2,188,888 | Clocker | Jan. 30, 1940 |